Nov. 16, 1954　　　W. H. HARSTICK　　　2,694,380
MILK CLAW WITH SHUTOFF VALVE FOR VACUUM CONNECTION
Filed March 2, 1953
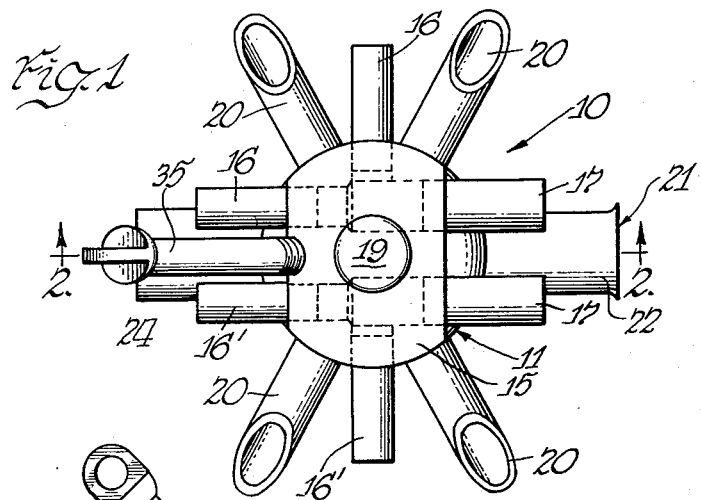
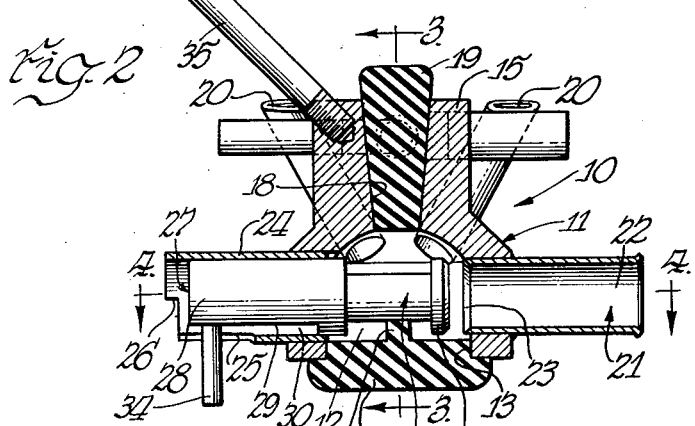
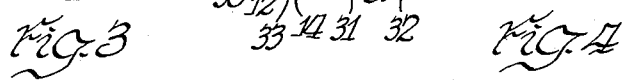
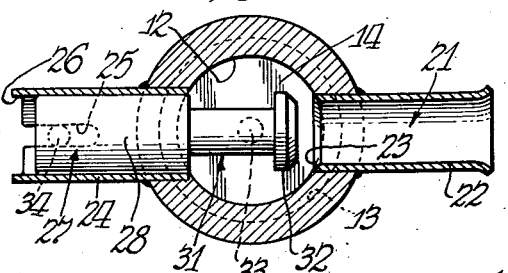
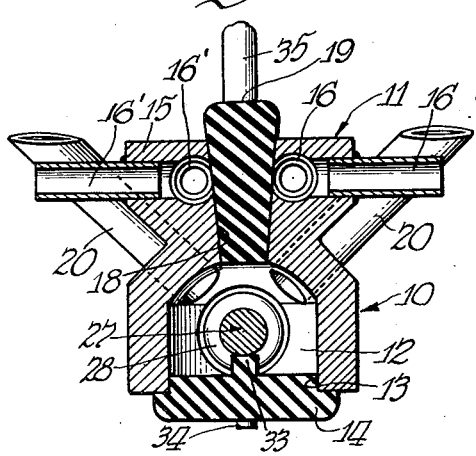
Inventor
William H. Harstick
Paul O. Pippel
Atty.

2,694,380
Patented Nov. 16, 1954

2,694,380

MILK CLAW WITH SHUTOFF VALVE FOR VACUUM CONNECTION

William H. Harstick, Oak Park, Ill., assignor to International Harvester Company, a corporation of New Jersey Application March 2, 1953, Serial No. 339,850

10 Claims. (Cl. 119—14.55)

This invention relates to an improvement in milker claws. More specifically the invention relates to a shut-off valve connected to the milker claw for shutting off the vacuum lines leading to the inflations of conventional teat cups.

It is a prime object of this invention to provide an improved milker claw having a valve member adapted to shut-off the vacuum connection leading to the milk receiving chamber of the claw.

It is another object of the invention to provide an improved milker claw having a shut-off valve for shutting of the vacuum connection leading to a milk receiving chamber, the valve member also including provisions for opening up a passage leading to the chamber and to the atmosphere.

A still further object of the invention is to provide an improved shut-off valve for milker claws, the valve being readily removable from the milker claw whereby the valve member and the associated parts of the claw may be thoroughly and easily cleaned.

A more specific object is to provide an improved claw having a milk receiving chamber, the chamber being adapted to communicate with a vacuum connection leading to a source of vacuum, the claw further including a sleeve in which a valve member is reciprocally positioned, the valve member having a valve element adapted to be placed into sealing engagement with the vacuum connection for shutting off the vacuum leading to the chamber, the valve member also including means defining with the sleeve, a passage adapted to communicate with the atmosphere and with the chamber during the closed position of the valve member, the valve member also being movable into a locked position wherein the passage is closed with respect to the chamber and the vacuum connection is in communication with the chamber to provide for vacuum within said chamber during a normal milking operation.

These and further objects will become more readily apparent from a reading of the specification when examined in connection with the accompanying sheet of drawing.

In the drawing:

Figure 1 is a plan view of an improved milker claw;

Figure 2 is a cross-sectional view through a milker claw taken substantially along the line 2—2 of Figure 1;

Figure 3 is a cross-sectional view through the milker claw the line being taken substantially along the line 3—3 of Figure 2; and Figure 4 is a detail sectional view of a portion of a milker claw and a valve member taken substantially along the line 4—4 of Figure 2.

A milker claw is generally designated by the reference character 10, the milker claw includes a body generally designated at 11, the body including a milk receiving chamber 12. The body 11 is provided with a centrally disposed opening 13 in which a resilient closure plug 14 is positioned. The closure plug 14 is resiliently positioned within the opening 13 and during the milking operation is held in place by means of the vacuum within the chamber 12. The body 11 includes an upwardly extending portion 15 provided with sets of vacuum and air nipples 16 and 16'. Extending outwardly from the body 11 are a plurality of pulsator connections 17. As best indicated in Figure 1, one of the pulsator connections 17 is in communication with the vacuum and air nipple set 16 and the other pulsator connection 17 is in communication with the vacuum and air nipple set 16'. The portion 15 is provided with a centrally disposed bore 18 which is adapted to communicate with the chamber 12. The bore 18, during the milking operation, is provided with a resilient plug 19 which suitably divides the nipple sets 16 and 16'. The operation of the vacuum and air nipples in relation to the pulsator connection 17 is conventional and need not be further described.

As best indicated in Figure 2, the body 11 is provided with a vacuum connection generally designated at 21. The vacuum connection 21 comprises a tubular conduit or member 22 which is provided at one end with a valve seat 23 of annular tapered construction adapted to open inwardly into the chamber 12. The vacuum connection 21 may be suitably connected to a conduit or hose (not shown) leading to a suitable source of vacuum. A sleeve 24 is diametrically disposed and in axial alignment with the vacuum connection 22. The sleeve 24 is provided at one end with an open end slot 25, the other end of the sleeve 24 being adapted to open inwardly into the chamber 12. The sleeve 24 is also provided with a recessed portion at its slotted end, the recess portion 26 extending laterally outwardly from the open end slot as best indicated in Figure 4.

A valve member generally designated at 27 is reciprocally positioned within the sleeve 24. The valve member 27 comprises a circular stem 28 which is provided, as indicated in Figure 2, with an undercut portion or flat surface 29. The undercut portion 29 forms with the inner peripheral surface of the sleeve 24 a passage designated at 30.

The stem 28 is provided with a spool shaped projection or extension generally designated at 31, the extension 31, extending inwardly into the chamber 12. The extension 31 is of lesser diameter than the circular stem 28. An enlarged annular valve element 32 is provided at the end of the extension 31. As best indicated in Figures 2 and 3 the closure plug 14 is provided with an upwardly extending resilient nib or stop 33. A pin 34 is connected to the outermost end of the valve member 27, the pin 34 being adapted to slide relative to the open end slot 25. A handle 35 is suitably connected to the claw 10 for supporting said claw in an upright position when not being used in the milking operation.

During the milking operation, the operator pushes the valve member 27, by means of the pin 34, outwardly or away from the vacuum connection 21 so that the vacuum connection 21 is in communication with the chamber 12 and provides a suitable vacuum therein. He turns the valve member 28 so that the pin 34 engages the recess 26 whereby the valve member 28 is restrained against the vacuum within the chamber 12, which would normally tend to pull the valve member 27 inwardly against the vacuum connection 21. Outward movement of the valve member 27 is limited by means of the resilient nib 33 which engages the enlarged element 32 and thus prevents further outward movement.

The milking operation thus can be carried on in the desired manner. After the cow has been milked the operator merely turns the valve member 27 so that the pin 34 is in alignment with the slot 25. The vacuum within the chamber 12, and within the vacuum connection 21, is now effective to pull the valve member 27 inwardly whereupon the valve element 32 seats on the valve seat 23 and shuts off the vacuum connection 21 from communication with the chamber 12. At this point the valve member 27 has moved sufficiently into the chamber 12 so that the undercut portion 29 or passage 30 is in direct communication with the chamber 12. The passage 30 is also in communication with the atmosphere and thus the chamber 12 likewise is in such communication. The suction within the inflations of the teat cups is now destroyed and therefore the teat cups may readily and quickly be removed from the teats of the animal. At the same time the vacuum within the vacuum line of the milking system is not effected since the vacuum connection 21 is suitably sealed by means of the valve element 32 against the entrance of air into the system.

In order to wash the improved milker claw the operator simply removes the resilient plug 14 from the opening 13 whereupon the valve member 27 may be removed from the claw. The sleeve 24, chamber 12, and vacuum connection 21 can now be very easily cleaned by simply directing a brush through said members.

It can now be seen that a new and simplified milker claw has been disclosed which fully achieves the objects of the invention. It must be understood that changes and modifications may be made in the construction without departing from the spirit of the invention as disclosed nor from the scope thereof as disclosed in the appended claims.

What is claimed is:

1. A milker claw for milking machines comprising a body having a milk receiving chamber, a plurality of milk hose nipples in communication with said chamber for directing milk thereto, a plurality of vacuum and air nipples on said body connectible to the teat cups of a milking machine, a vacuum connection on said body communicating with the chamber, said vacuum connection including a tubular portion having a tapered annular valve seat within said chamber, a sleeve on said body, said sleeve being diametrically opposed to said tubular portion and opening inwardly at one end into said chamber, said sleeve having a longitudinally extending open end slot at its other end, said sleeve having a recessed portion adjacent the open end of said slot, the recessed portion extending laterally with respect to said slot, a valve member slidably positioned in said sleeve said valve member having a circular stem, a circular extension projecting from the stem into said chamber, said circular extension having a lesser diameter than said stem, an annular enlargement connected to the extension, a projection within the chamber engageable with the enlargement for limiting the movement of said valve member outwardly from the chamber, said stem having an undercut portion providing with said sleeve a passage in continual communication with the atmosphere, and a pin projecting from the stem through said slot, said valve member being movable inwardly toward the chamber in response to vacuum within the chamber into sealing engagement with the valve seat whereby said passage is in communication with the chamber and the atmosphere, said valve member being movable outwardly from the chamber for engaging the pin with the recessed portion whereby said vacuum connection is in communication with said chamber and said passage is closed with respect to said chamber.

2. A milker claw for milking machines comprising a body having a milk receiving chamber, a plurality of milk hose nipples connected to said body in communication with said chamber, said body having an enlarged opening, a resilient closure member for said opening, a tubular vacuum connection on said body having one end adapted to communicate with the chamber and its other end connectible to a source of vacuum, a sleeve on said body disposed opposite to said vacuum connection and having one end opening inwardly into said chamber, said sleeve having a longitudinally extending open end slot at its other end, a valve member slidably positioned within said sleeve, said valve member comprising a circular stem having an undercut portion at one end to provide with said sleeve a passage in continual communication with the atmosphere, a pin on said stem slidable in said slot during movement of said valve member, an extension on the opposite end of said stem, said extension projecting into said chamber and being of lesser diameter than said stem, an annular valve element connected to said stem, said valve element having a larger diameter than said extension, said valve member being movable in response to vacuum within said chamber toward said vacuum connection whereby said valve element engages said vacuum connection to close the same with respect to said chamber whereby said passage and said chamber are in communication, said valve member being movable in a direction away from said vacuum connection whereby said passage is closed with respect to said chamber, and a projecting nib on said closure member engageable with the valve element for limiting the movement of said valve member away from said vacuum connection.

3. A milker claw for milking machines comprising a body having a milk receiving chamber, a plurality of milk hose nipples connected to said body and in communication with said chamber, said body having an enlarged opening, a removable closure member for said opening, a tubular vacuum connection on said body having one end adapted to communicate with the chamber and its other end connectible to a source of vacuum, a sleeve on said body disposed opposite to said vacuum connection and having one end opening inwardly into said chamber, said sleeve having a longitudinally extending open end slot at its other end, a valve member slidably positioned within said sleeve, said valve member comprising a circular stem having an undercut portion at one end to provide with said sleeve a passage in continual communication with the atmosphere, a pin on said stem slidable in said slot during movement of said valve member, an extension on the opposite end of said stem, said extension projecting into said chamber and being of lesser diameter than said stem, an annular valve element connected to said stem, said valve element having a larger diameter than said extension, said valve member being movable in response to vacuum within said chamber toward said vacuum connection whereby said valve element engages said vacuum connection to close the same with respect to said chamber whereby said passage and said chamber are in communication, said valve member being movable in a direction away from said vacuum connection whereby said passage is closed with respect to said chamber, and means on said closure member engageable with the valve member for limiting the movement thereof away from said vacuum connection.

4. A milker claw for milking machines comprising a body having a milk receiving chamber, a plurality of milk hose nipples connected to said body and in communication with said chamber, a tubular vacuum connection on said body having one end adapted to communicate with the chamber and its other end connectible to a source of vacuum, a sleeve on said body disposed opposite to said vacuum connection and having one end opening inwardly into said chamber, said sleeve having a longitudinally extending open end slot at its other end, a valve member slidably positioned within said sleeve, said valve member comprising a circular stem having an undercut portion at one end to provide with said sleeve a passage in continual communication with the atmosphere, a pin on said stem slidable in said slot during movement of said valve member, an extension on the opposite end of said stem, said extension projecting into said chamber and being of lesser diameter than said stem, and an annular valve element connected to said stem, said valve element having a larger diameter than said extension, said valve member being movable in response to vacuum within said chamber toward said vacuum connection whereby said valve element engages said vacuum connection to close the same with respect to said chamber whereby said passage and said chamber are in communication, said valve member being movable in a direction away from said vacuum connection whereby said passage is closed with respect to said chamber.

5. A milker claw for milking machines comprising a body having a milk receiving chamber, a plurality of milk hose nipples connected to said body and in communication with said chamber, a tubular vacuum connection on said body having one end adapted to communicate with the chamber and its other end connectible to a source of vacuum, a sleeve on said body disposed opposite to said vacuum connection and having one end opening inwardly into said chamber, a valve member slidably positioned within said sleeve, said valve member comprising a circular stem having an undercut portion at one end to provide with said sleeve a passage in continual communication with the atmosphere, an extension on the opposite end of said stem, said extension projecting into said chamber and being of lesser diameter than said stem, and an annular valve element connected to said stem, said valve element having a larger diameter than said extension, said valve member being movable in response to the vacuum within said chamber toward said vacuum connection whereby said valve element engages said vacuum connection to close the same with respect to said chamber whereby said passage and said chamber are in communication, said valve member being movable in a direction away from said vacuum connection whereby said passage is closed with respect to said chamber.

6. A milker claw for milking machines comprising a body having a milk receiving chamber, a plurality of milk hose nipples connected to said body in communication with said chamber, a tubular vacuum connection on said body having one end adapted to communicate with the chamber and its other end connectible to a source of vacuum, a sleeve on said body disposed opposite to said vacuum connection and having one end opening inwardly into said chamber, a valve member slidably positioned within said sleeve, said valve member comprising a circular stem having an undercut portion at one end to provide with said sleeve a passage in continual communication with the atmosphere, an extension on the opposite end of said stem, said extension projecting into said chamber, and an annular valve element connected to said stem, said valve member being movable in response to vacuum within said chamber toward said vacuum connection whereby said valve element engages said vacuum connection to close the same with respect to said chamber whereby said passage and said chamber are in communication, said valve member being movable in a direction away from said vacuum connection whereby said passage is closed with respect to said chamber.

7. A milker claw for milking machines comprising a body having a milk receiving chamber, a plurality of milk hose nipples connected to said body and in communication with said chamber, a tubular vacuum connection on said body having one end adapted to communicate with the chamber and its other end connectible to a source of vacuum, a sleeve on said body having one end opening inwardly into said chamber, a valve member slidably positioned within said sleeve, said valve member comprising a circular stem having an undercut portion at one end to provide with said sleeve a passage in continual communication with the atmosphere, an extension on the opposite end of said stem, said extension projecting into said chamber, and an annular valve element connected to said stem, said valve member being movable in response to vacuum within said chamber toward said vacuum connection whereby said valve element engages said vacuum connection to close the same with respect to said chamber whereby said passage and said chamber are in communication, said valve member being movable in a direction away from said vacuum connection whereby said passage is closed with respect to said chamber.

8. A milker claw comprising a body having a milk receiving chamber, milk hose nipples on said body communicating with said chamber, a vacuum connection on said body having an opening adapted to communicate with said chamber, a sleeve on said body in alignment with said vacuum connection, a valve member reciprocally positioned in said sleeve, said valve member having a spool shaped projection at one end movable within said chamber, a valve element on said spool shaped projection, said valve member having an undercut portion on its other end, said undercut portion being in continual communication with the atmosphere, and means for moving the valve member toward said vacuum connection whereby said valve element seals said vacuum connection and said undercut portion is in communication with said chamber, said valve member being movable away from said vacuum connection whereby said undercut portion is closed with respect to said chamber and said vacuum connection is in communication with said chamber.

9. A milker claw comprising a body having a milk receiving chamber, milk hose nipples on said body communicating with said chamber, a vacuum connection on said body having an opening adapted to communicate with said chamber, a sleeve on said body, a valve member reciprocally positioned in said sleeve, said valve member having a spool shaped projection at one end movable within said chamber, a valve element on said spool shaped projection, said valve member having an undercut portion on its other end, said undercut portion being in continual communication with the atmosphere, and means for moving the valve member toward said vacuum connection whereby said valve element seals said vacuum connection and said undercut portion is in communication with said chamber, said valve being movable away from said vacuum connection whereby said undercut portion is closed with respect to said chamber and said vacuum connection is in communication with said chamber.

10. A milker claw comprising a body having a milk receiving chamber, milk hose nipples on said body communicating with said chamber, a vacuum connection on said body having an opening adapted to communicate with said chamber, a sleeve on said body, a valve member reciprocally positioned in said sleeve, said valve member having a projection at one end movable within said chamber, and a valve element on said projection, said valve member having an undercut portion communicating with the atmosphere, and said valve member being movable in response to vacuum in said chamber toward said vacuum connection whereby said valve element seals said vacuum connection and said undercut portion is in communication with said chamber, said valve member being movable away from said vacuum connection whereby said undercut portion is closed with respect to said chamber and said vacuum connection is in communication with said chamber.

References Cited in the file of this patent

UNITED STATES PATENTS

| Number | Name | Date |
|---|---|---|
| 2,507,969 | Gascoigne | May 16, 1950 |

FOREIGN PATENTS

| Number | Country | Date |
|---|---|---|
| 340,599 | Great Britain | Jan. 2, 1931 |